United States Patent

[11] 3,623,811

[72] Inventors David B. Lederer;
David E. Perlman, both of Rochester, N.Y.
[21] Appl. No. 85,699
[22] Filed Oct. 30, 1970
[45] Patented Nov. 30, 1971
[73] Assignee Eastman Kodak Company
Rochester, N.Y.
Continuation of application Ser. No.
751,080, Aug. 8, 1968. This application
Oct. 30, 1970, Ser. No. 85,699

[54] ELECTROOPTICAL RANGEFINDER MEANS
8 Claims, 12 Drawing Figs.

[52] U.S. Cl. .................................... 356/4,
250/209, 95/44 C
[51] Int. Cl. .................................... G01c 3/08
[50] Field of Search............................. 356/4, 5;
250/209; 95/44 C; 352/140

[56] References Cited
UNITED STATES PATENTS
3,270,647 9/1966 Jakob et al.................. 95/44 C
3,054,898 9/1962 Westover et al. ............. 356/4
3,273,124 9/1966 Greanias ..................... 250/202 X Primary Examiner—Rodney D. Bennett, Jr.
Assistant Examiner—S. C. Buczinski
Attorney—Raymond L. Owens ABSTRACT: This invention relates to an electrooptical rangefinder of the split field type which produces, along a shear axis, two split images of the object whose range distance is to be determined, the degree of adjustment necessary to bring the two split images into symmetrical alignment being a function of the range distance.

A plurality of $n$ photosensitive transducer pairs are located on opposite sides of the shear axis, and adapted to receive the illumination reflected from the two split images. Electrical circuitry is coupled to the plurality of $n$ photosensitive transducer pairs to provide a plurality of $n$ signals, the signal for each discrete pair being arbitrarily denominated a logical ZERO or a logical ONE indicative of the balanced or unbalanced state of illumination experienced by a photosensitive transducer pair respectively.

Logic circuitry is coupled to the electrical circuitry to receive the plurality of logical signals and derive an output signal when a predetermined number of the photosensitive transducer pairs receive balanced illumination, which output signal, by reason of the fact that the split images are in alignment, is a function of the range distance.

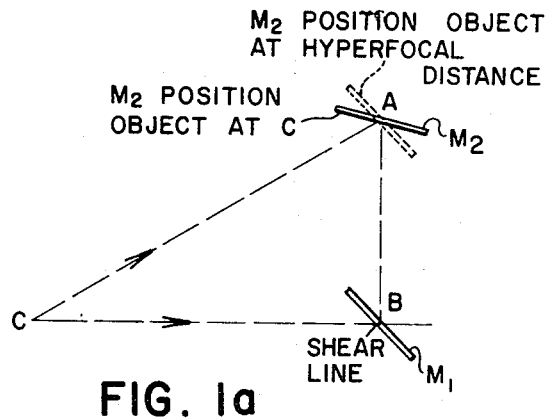
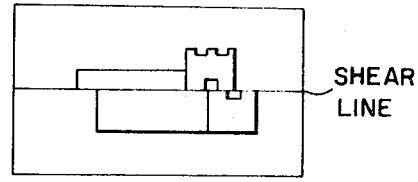
FIG. 1a    FIG. 1b
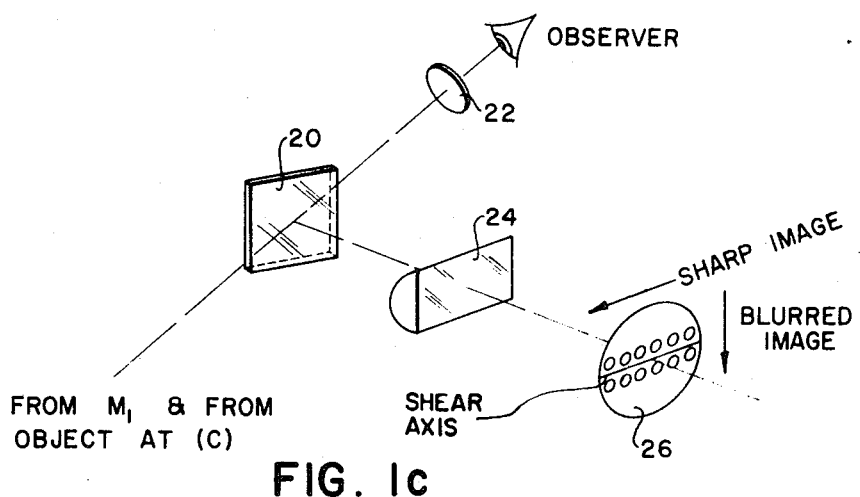
FIG. 1c
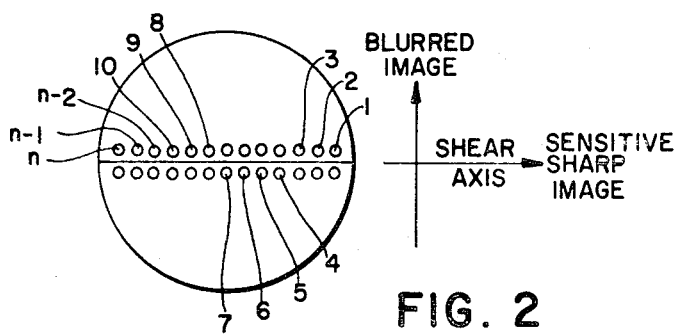
FIG. 2
DAVID B. LEDERER
DAVID E. PERLMAN
INVENTOR.
ATTORNEYS

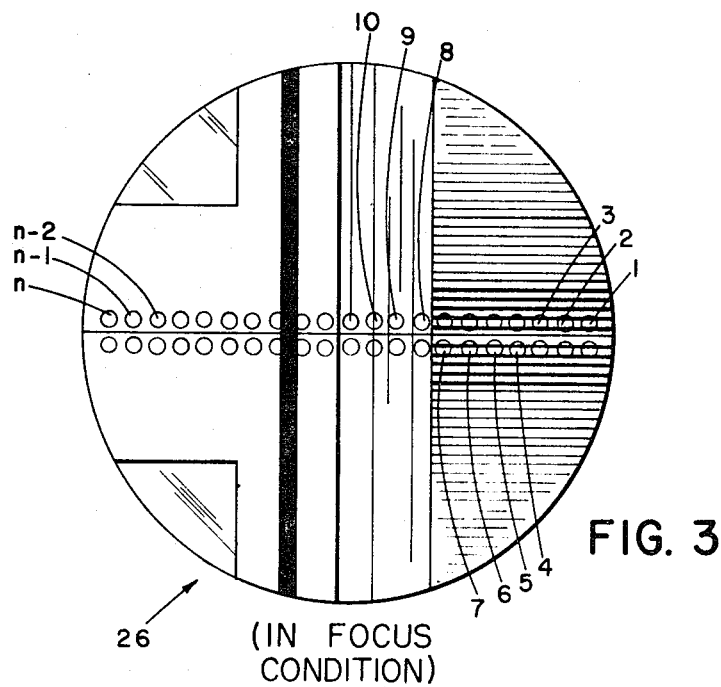
FIG. 3 (IN FOCUS CONDITION)
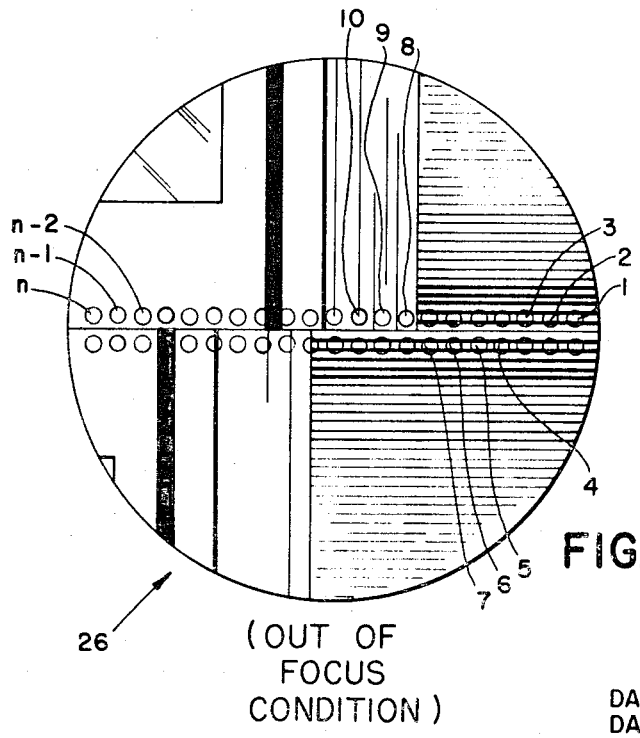
FIG. 4 (OUT OF FOCUS CONDITION)
DAVID B. LEDERER
DAVID E. PERLMAN
INVENTORS

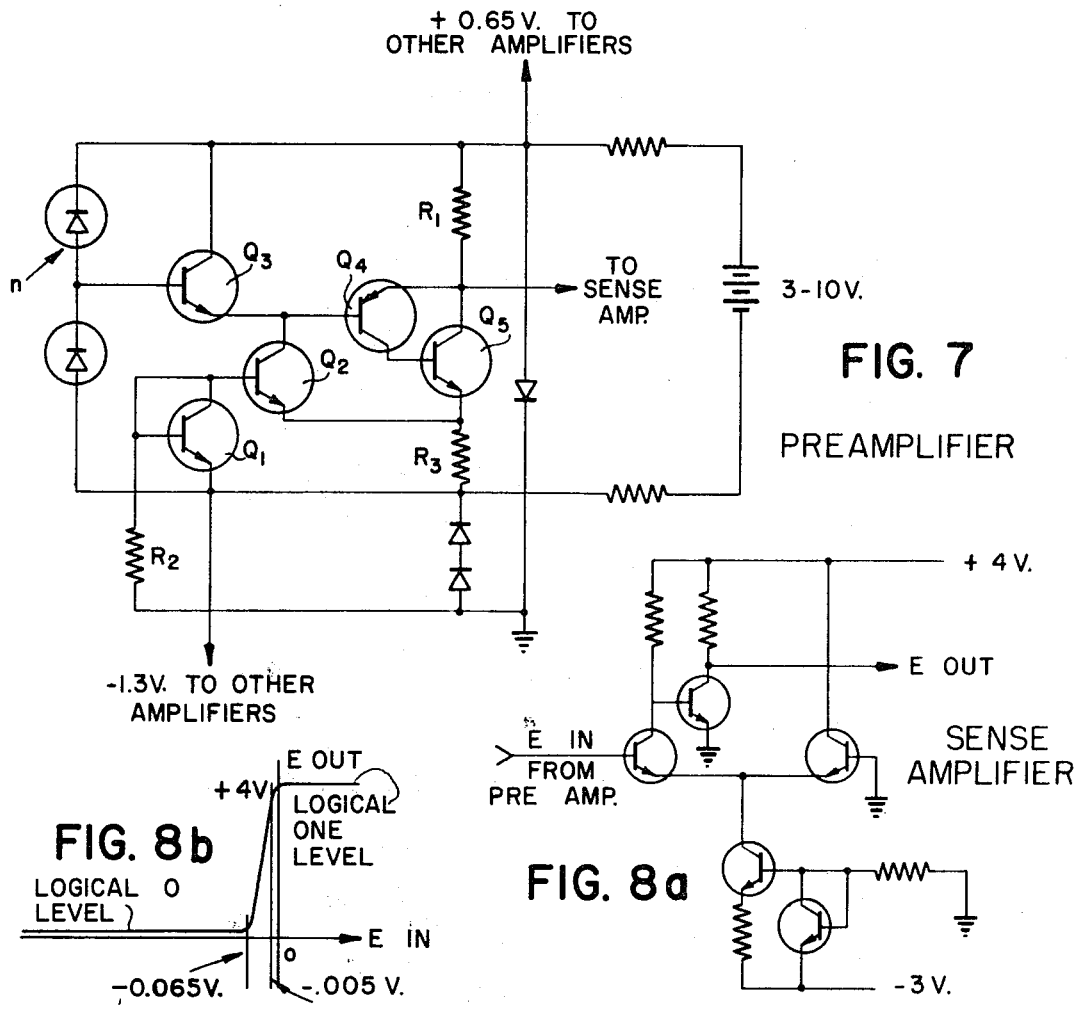

ELECTROOPTICAL RANGEFINDER MEANS

CROSS-REFERENCES TO RELATED APPLICATION

This is a streamline continuation of application Ser. No. 751,080, filed Aug. 8, 1968. See the copending application for Complementary Emitter Follower, Ser. No. 699,437 filed on Jan. 22, 1968, now Pat. No. 3,517,324, in the name of David E. Perlman, and assigned to the same assignee as the instant invention.

BACKGROUND OF THE INVENTION

1. Field of the Invention

This invention relates to rangefinder apparatus which utilizes the classical split field dual mirror arrangement, the range distance being a function of the angular displacement required of the movable mirror to produce alignment or symmetry of the split images received by the fixed mirror.

2. Description of the Prior Art

It has long been an objective in the prior art of range-finding to eliminate the human error inherent in the classical split image rangefinder, by providing for automatic controls to enable the requisite alignment of the split images to be ascertained. This objective has been sought because the human operator was prone to err in the manual adjustment either by reason of temporary stress and fatigue which could produce carelessness, or simply because the operator did not physically possess the necessary visual acuity to recognize when a null had been achieved.

One solution to the problem is provided in U.S. Pat. No. 3,270,647 to Jakob et al., which describes an object-focusing apparatus using a pair of identical photocells or photosensitive resistors, situated behind cross prisms. The camera is then focused upon the subject for which the range is desired, in such a way that a contrasting line of the subject, such as its outline against the atmosphere, defines a junction between light and dark areas which passes vertically through the optical axis of the camera objective, so that the line of the subject coincides with the vertical center of the two prisms. The photocurrents produced in the photocells or photosensitive resistors are balanced in a bridge circuit, the null being indicative that the correct range distance has been established.

SUMMARY OF THE INVENTION

This invention relates to electrooptical rangefinder means which produces along a shear line two split images of the object for which range distance is required, the degree of adjustment necessary to bring the two split images into matching alignment being a function of the range distance. A plurality of $n$ photosensitive transducer pairs, where $n$ may be any integer 1, 2, 3,...... $n$, are arranged on opposite sides of the mirror shear line, and adapted to receive reflected illumination from the two split images respectively. Circuit means are electrically coupled to the plurality of $n$ photosensitive transducer pairs to derive a plurality of signals, each respective signal being arbitrarily designated a logical ZERO or a logical ONE, indicative of balanced and unbalanced illumination on a discrete photosensitive transducer pair respectively. Logical means are coupled to the circuit means to receive said plurality of logical signals, and from which to derive an output signal, when a predetermined number of photosensitive transducer pairs receive balanced illumination, the output signal being both indicative that the split images are matched, and being a function of the range distance to the subject under consideration.

In contemplation of the instant invention, the output signal may be developed when all photosensitive transducer pairs receive balanced illumination or when a predetermined number of photoelectric transducer pairs receive balanced illumination. In the embodiments described herein the logical means are arranged to combine the outputs of the photosensitive transducer pairs so as to realize both these concepts.

Accordingly, it is an object of this invention to provide an electrooptical rangefinder means in which the determination of image coincidence is achieved automatically to eliminate human error based upon differences in individual visual acuity and adaptation to stress conditions.

The novel features of the invention are set forth with particularity in the appended claims. The invention itself, however, both as to its organization and method of operation, together with further objects and advantages thereof may best be understood by reference to the description to follow, considered in connection with the accompanying drawings.

BRIEF DESCRIPTION OF THE DRAWINGS

FIG. 1a is an explanatory diagram of the classic split field rangefinder;

FIG. 1b is an illustrative picture showing the appearance of the split images when the rangefinder is out of focus;

FIG. 1c is a schematic, pictorial view of the electrooptical rangefinder means in accordance with the instant invention;

FIG. 2 is a schematic showing a plurality of cooperating photosensitive transducer pairs arranged on opposite sides of the shear line in accordance with the instant invention;

FIG. 3 is a schematic diagram showing a plurality of photosensitive transducer pairs arranged, in accordance with the instant invention, on opposite sides of the shear line of a split image rangefinder under balanced conditions;

FIG. 4 is a similar schematic diagram showing the plurality of photosensitive transducers pairs under unbalanced conditions;

FIG. 7 is an electrical schematic of the preamplifier used in the circuitry of FIGS. 5 and 6;

FIG. 8a is an electrical schematic of the sense amplifier used in the embodiment of FIGS. 5 and 6;

FIG. 8b is a waveform diagram showing the input-output voltage characteristic of the sense amplifier of FIG. 8a; and FIG. 9 is a truth table used in explaining the operation of the embodiments of FIGS. 5 and 6.

Figure 5:
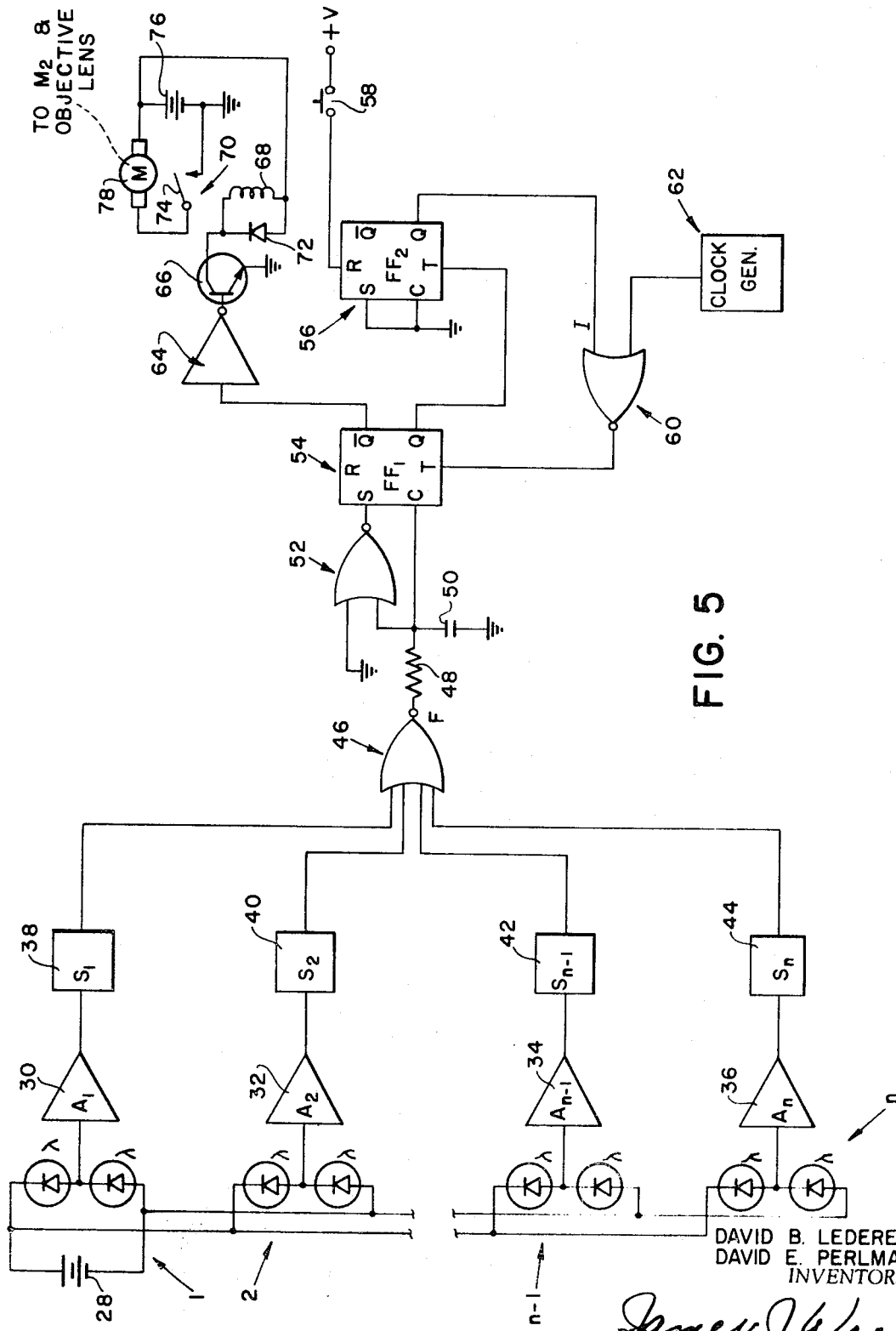
FIG. 5 is an electrical schematic in accordance with one illustrative embodiment of the invention.

The electrooptical rangefinder means of the instant invention, is intended for utilization with photographic cameras. In view of the fact that photographic cameras are now so well known in the art, the description to follow will be directed in particular to those elements forming part of, or cooperating more directly with, the instant invention. Camera elements and/or camera functions not shown or described, will be understood to be readily obtainable from commercially available sources or selectable from techniques well known to those practicing in the art.

Before discussing the invention proper it will be helpful to briefly review the environmental setting and operations of the classic split field rangefinder. In FIG. 1a there is shown a schematic of a typical split field rangefinder. Two mirrors $M_1$ and $M_2$ are arranged in spaced relationship within the apparatus such as a camera. The element $M_1$ is a mirror silvered on one half with clear glass on the other half. (This type of mirror is sometimes loosely identified as a half-silvered mirror, although more properly the term "half-silvered" has reference to the nature of the layer of silver deposited.) Through an aperture in the camera, $M_1$ receives light from a distant object. The mirror $M_2$ is arranged to pivot about a point, and through a suitable aperture in the apparatus it too receives light from the distant object. When an object is sufficiently far away so that the rays of light entering the apertures are substantially parallel, then the mirror $M_2$ reflects light at right angles to the mirror $M_1$. The observer looking at mirror $M_1$ sees a reflected image from mirror $M_2$ as well as a direct image from the distant object. When the object is at infinity, (more correctly the hyperfocal distance of the camera), the image, although split by the half-silvered mirror $M_1$, appears as one. As the object approaches the camera the total image seen by the observer at mirror $M_1$ will be displaced along the shear line as shown in FIG. 1b. By rotating the mirror $M_2$ the split images can be brought into alignment, and by measuring the small angle through which the mirror $M_2$ has been rotated, the distance to the object or subject can be determined by triangulation principles.

In many cameras the displacement of the mirror $M_2$ is coupled to the objective lens of the camera so that when alignment of the split images has been established by the operator, the camera objective lens is in focus for picture taking. The process of adjusting the mirror $M_2$ in order to obtain matching or alignment of the split field images along the shear line, is somewhat tedious and depends for success in large measure on the visual acuity of the operator. In times of stress or fatigue, the adjustments may prove particularly vexatious.

The instant invention proposes to reduce these tasks for the operator by making the decision process automatic. The light reflected from mirror $M_1$ is passed to a beam splitter 20 where it is directed into two paths. The first path is through the viewfinder lens 22, and the second path is through a cylindrical lens 24 to an array of photosensitive transducer pairs indicated generally at 26. The total image projected will be similar to that depicted in FIG. 1b. The various components are carefully aligned so that the shear line of the split field shown in FIG. 1b coincides with the shear axis of the photosensitive transducer array 26.

As shown more clearly in FIG. 2 the plurality of photosensitive transducers are arranged in pairs 1, 2, 3,...... (n—2), (n—1), n, on opposite sides of the shear axis. Advantageously these photosensitive transistors may be photodiodes. With present-day integrated circuit techniques, a great number of photodiodes may be thus arranged along the shear axis and additionally, by reason of the manufacturing technique used, the photodiodes are perfectly matched and balanced. By means of the cylindrical lens 24, FIG. 1c, the split field image is focused upon the photodiodes so that it will be very sharp along the horizontal axis, while being blurred along the vertical axis as indicated in both FIGS. 1c and 2. Thus the optoelectronic system is sensitive to shear between the upper and lower images, but is insensitive to variations in brightness perpendicular to the shear axis.

In FIGS. 3 and 4 an arbitrary black-and-white pattern has been selected to illustrate the overall techniques employed in the instant invention. In FIG. 3, the photodiode pairs are balanced i.e. all receive equal illumination. As may be observed in FIG. 4 the photodiode pairs 1–7 all receive equal illumination, while other pairs such as 8, 9, 10 are unequally illuminated. This unbalance is utilized in accordance with this invention, to drive a motor 78 (FIGS. 5 and 6) which may be coupled to the objective lens of the camera and to the adjustable mirror $M_2$, the motor-driving mirror $M_2$ unit a predetermined number or even all of the photodiode pairs are balanced.

In contemplation of this invention the automatic focusing system may be arranged so that an in-focus condition is achieved when all the photodiodes are equally illuminated, or when a fixed percentage are equally illuminated.

THE EMBODIMENT OF FIG 5

In the embodiment of FIG. 5, the photodiode pairs NOR-gate arranged so that the in-focus condition is NOR-gate when all the photosensitive transducer pairs receive equal illumination. Using the same numeration as utilized in NOR-gate 2, 3 and 4 the photodiode pairs are connected as shown with reverse NOR-gate applied to the PN-junction by battery 28 connected as shown. The photodiode pairs 1,2,... (n—1), n S, C, connected to a plurality of preamplifiers 30, 32, 34, 36 equal in number to the photosensitive transducer pairs utilized. The output of each photodiode pair is combined at the input of the respective preamplifier.

The details of the preamplifier are shown in FIG. 7. The preamplifier will not be explained here in detail since it is the subject of a copending patent application for "Complementary Emitter Follower," Ser. No. 699,437, filed on Jan. 22, 1968 in the name of David E. Perlman and assigned to the same assignee as the instant invention. Briefly this preamplifier has a very high input impedance and is extremely stable. The output of each preamplifier swings between approximately —0.1 and +0.1 volt indicating balance and unbalance respectively.

The output of each preamplifier 30, 32, 34, 36 is fed to a sense amplifier 38, 40, 42, 44 respectively. The sense amplifier may have the configuration shown in FIG. 8a. The sense amplifier is a high-gain differential amplifier that is cut off when its input is more negative than about —0.065 volt, and swings to full saturation when the input goes within a few millivolts of 0.

All the sense amplifier outputs are connected to a NOR gate shown generally at 46. The output of NOR-gate 46, after filtering through an RC-filter comprising resistor 48 and capacitor 50, is applied to another NOR-gate indicated generally at 52 and to a flip-flop indicated generally at 54. (The NOR-gate 52 is used simply as an inverter and an inverting amplifier could be used in its place). The flip-flop has three inputs indicated at S, C, and T, and two outputs indicated at Q and $\overline{Q}$.

A second flip-flop is indicated generally at 56. Flip-flop 56 similarly has inputs at S, C, and T, and outputs at $\overline{Q}$ and Q. The S and C inputs of flip-flop 56 are grounded, while the T input is connected to the Q output of flip-flop 54. The logic sequence of flip-flop 56 is initiated by applying a positive voltage to the reset line R of flip-flop 56, by means of a switch 58 which is connected to positive battery here indicated as +V.

Another NOR-gate is indicated at 60. The output of NOR-gate 60 is connected to the T input of flip-flop 54, while its inputs are derived from the Q output of flip-flop 56, and the clock pulses which it receives from the clock generator indicated generally at 62.

An inverting buffer amplifier indicated generally at 64 is connected between the $\overline{Q}$ output of the flip-flop 54, and a transistor indicated at 66. The transistor 66 is an NPN-transistor connected in the common emitter configuration, the base being connected to the buffer amplifier 64 and the collector being connected to the coil 68 of a relay indicated generally at 70. The coil 68 of the relay 70 is connected in series with the collector of the transistor 66. A protective diode 72 is arranged in shunt with the coil 68. This diode 72 protects the transistor 66 against inductive transients. The movable contact 74 of the relay 70 is normally open, and is arranged in series with a battery 76 and motor 78.

OPERATION OF CIRCUITRY FIG. 5

As previously pointed out, the output of each photodiode pair 1, 2,......(n—1), n is combined as the input to the preamplifiers 30, 32, 34, 36 etc. If the illumination on a discrete diode pair is equal, then the input current to the associated preamplifier is zero. If the upper diode in each pair is more brightly illuminated, current flows into the input of the preamplifier. The preamplifiers are constructed so that the voltage swings between —0.1 volt and +0.1 volt. When the input to a preamplifier is at zero, the output of the preamplifier is a constant —0.1 volt. If there is input current to the preamplifier it swings toward +0.1 volt indicating an unbalanced condition. Preamplifiers are connected to the sense amplifiers 38, 40, 42, 44 etc. The sense amplifiers are cut off when the input is more negative than about —0.065 volt, and swing to full saturation when the input goes within a few millivolts of zero.

In contemplation of the logical algebra, the output of a sense amplifier is a logical ZERO when the photodiode pair with which it is associated is balanced, and a logical ONE when the photodiode pair with which it is associated is unbalanced. The output of all the sense amplifiers 38, 40, 42, 44 etc., are connected as inputs to the NOR-gate 46. With the output of the respective sense amplifiers indicated as $S_1, S_2, S_3$ etc., the Boolean logical expression is:

$$F = \overline{S_1} \cdot \overline{S_2} \cdot \overline{S_3} \cdot \overline{S_4} \ldots \overline{S_n}$$

Where the function F=the output of NOR-gate 46

$\overline{S_1}$=the output of sense amplifier $S_1$
$\overline{S_2}$=the output of sense amplifier $S_2$
$\overline{S_3}$=the output of sense amplifier $S_3$
$\overline{S_4}$=the output of sense amplifier $S_4$
$\overline{S_n}$=the output of sense amplifier $S_n$ F will be logical ONE only if all the sense amplifier outputs are ZERO and will be a logical ZERO if any one or more of the sense amplifiers has an output which is a logical ONE. This F=ONE here indicates an in-focus condition, and a F=ZERO indicates a defocus condition.

Prior to the actuation of the reset switch 58, the Q output of flip-flop 56 is ONE. In this state, the NOR-gate 60 will not permit the clock pulses from clock generator 62 to pass to flip-flop 54. The flip-flop 54 cannot respond to its inputs S and C without the receipt of clock pulses.

In the explanatory table of FIG. 9, the columnar headings have the following interpretations:

$S_1$, $S_2$=the logical status of the sense amplifiers
F=the logical value (ONE or ZERO) of the function F
M=the status of the motor 78, a 0 arbitrarily indicating that it is deenergized, and a 1 indicating that it is energized.
I=the logical value (ONE or ZERO) of the inhibit voltage applied to NOR-gate 60.
Switch 58=the status of the switch (open or closed), a 0 arbitrarily indicating it is open, and a "momentary 1"indicating it is momentarily closed.

Considering now the table of FIG. 9 in connection with the circuitry of FIG. 5, assume first that the camera is initially in focus i.e. F=1. This condition is shown in line 1 of the table of FIG. 9. Then the S C input to flip-flop 54 is 0, 1 respectively. If the reset switch is pressed at this time, the Q output of flip-flop 56 will switch to ZERO permitting clock pulses to reach flip-flop 54. The output of flip-flop 54 will be Q=0, $\overline{Q}$=1 and nothing will happen because this is the output which satisfies the input conditions 01.

Assume now, as in line 3 of the table of FIG. 9, a defocus condition i.e. F=0. Then the S C input to flip-flop 54 is 1, 0 respectively. Upon application of the reset switch 58, (line 4 of FIG. 9), the inhibit signal is ZERO and the state of flip-flop 54 changes to Q=1, $\overline{Q}$=0. The transistor 66 which has been cut off now has a positive pulse applied to its base, and it conducts in a path which may be traced from battery 76, through the collector-emitter and return to ground. The collector current through the coil 68 causes the relay contact 74 to close and the motor 78 is energized; the rotary displacement of the motor 78 is coupled to objective lens and to mirror $M_2$ (depending upon the mode of operation selected for the camera). In some applications it may be desirable to avoid loading down the motor so that the motor will only operate the mirror $M_2$, and a stop means will be displaced so that, in its final arrested position, it will determine the position, and hence the focus of the objective lens.

The motor 78 continues to run until the focus condition occurs as indicated by F=1 (table 9 line 5). When this occurs, flip-flop 54 returns to an initial state at the first clock pulse following the appearance of ZERO, ONE at its input S C. The resulting negative transition i.e. ONE to ZERO at the Q output of flip-flop 54, causes flip-flop 56 to change state, so that its Q output goes from ZERO to ONE producing a blocking condition at NOR-gate 60. This action terminates the decision-making process; the camera is in focus. As indicated in the sixth line of table 9, should there be a slight overshoot or noise condition (resulting in F=0), the apparatus would not respond because of the inhibit voltage ONE on the input I to the NOR-gate 60.

The so-called J-K-flip-flop, which is the type of flip-flop used at 54 and 56, will not respond to a positive transition at its clock terminal (that is a positive-going signal) therefore when the Q terminal of flip-flop 54 changed from 0 to 1, this is a positive-going signal and flip-flop 56 will not respond; however, when the Q terminal of flip-flop 54 changes from 1 to 0, this is a negative-going signal, and flip-flop 56 responds developing a ONE at its Q output. As previously pointed out this is an inhibit signal preventing the NOR-gate 60 from sending clock pulses to flip-flop 54.

THE EMBODIMENT OF FIG. 6

As indicated above in some application it may not be desirable to have in-focus occur when all the photodiodes have equal outputs. The decision-making process may be simplified somewhat by combining the photosensitive transducer pairs as inputs to OR-gates. This is done in the circuitry of FIG. 6 where the photosensitive transducer pair 1 is combined with photosensitive transducer pair (n-1) as inputs to the OR-gate 80, while photosensitive transducer pair 2 is combined with photosensitive pair n as inputs to OR-gate 82. The outputs are applied as inputs to NOR-gate 84. The remaining circuitry is exactly the same as that of the embodiment of FIG. 5.

OPERATION OF THE CIRCUITRY OF FIG. 6

Figure 6:
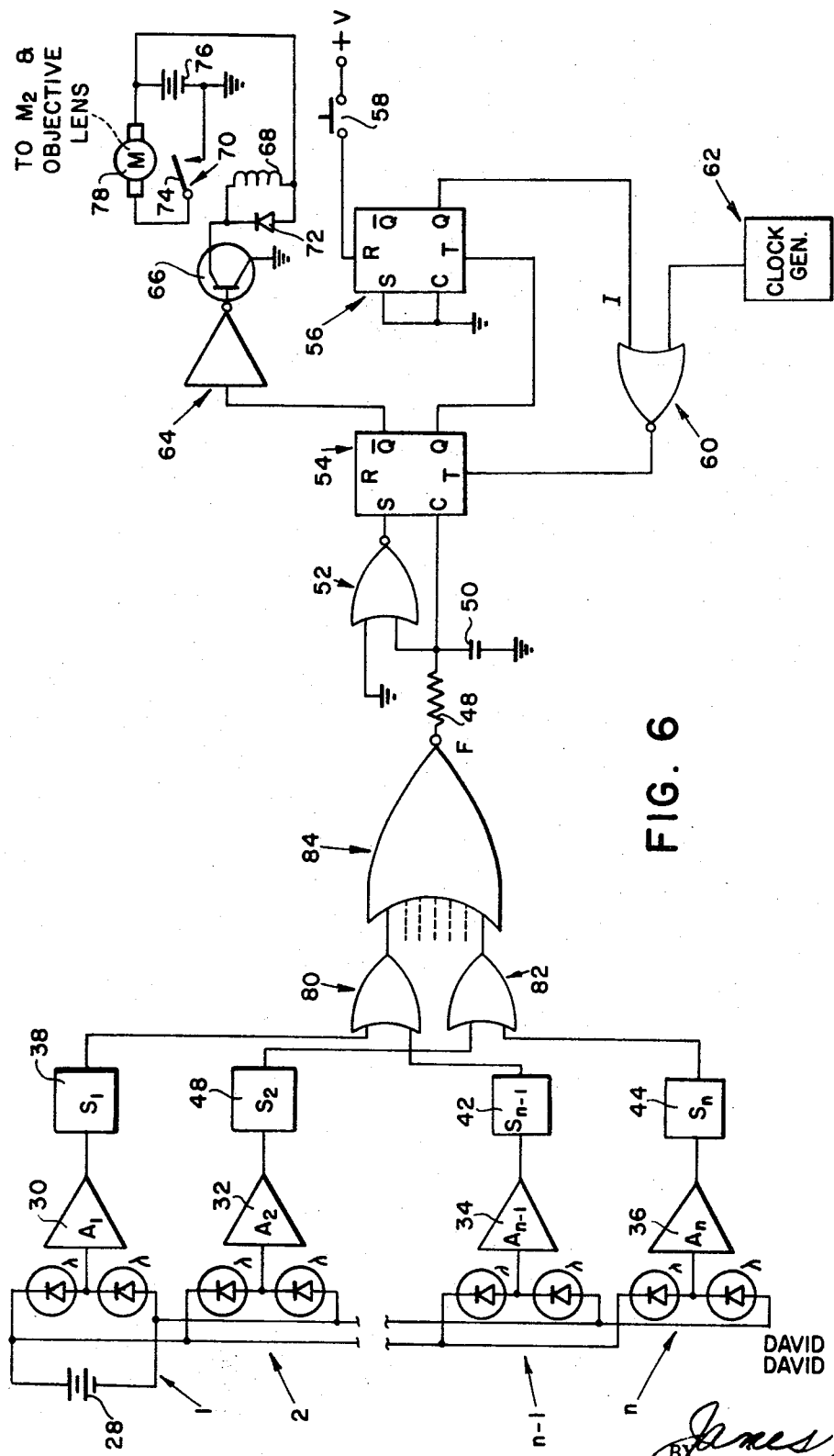
FIG. 6 is an electrical schematic of an alternate embodiment of the instant invention.

The circuitry of FIG. 6 operates substantially the same as that shown in FIG. 5. It will be recalled that a balance condition of a photosensitive transducer pair is indicated by a logical ZERO, while an unbalanced condition is defined by a logical ONE.

The OR-gates 80, 82 provide an output when either one or both of the associated photosensitive transducer pairs are balanced. The summation of the inputs at the NOR-gate 84 and the operation of the flip-flops etc. is then exactly the same as in the circuitry of FIG. 5 to provide the digital value for the Boolean function F indicative of in-focus or out-of-focus as required.

The summation of the photosensitive transducer pairs at the OR-gates provides for some leeway in the decision-making process, and additionally, provides a redundancy which insures against possible failure of one or more photosensitive transducer pairs.

The invention has been described in detail with reference to preferred embodiments thereof, but it will be understood that variations and modifications can be effected within the spirit and scope of the invention as described hereinabove and as defined in the appended claims.

We claim:

1. For use with a range-finding apparatus including means for forming first and second images, each of a discrete portion of an object scene in an image plane adjacent to each other along an interface axis, means for moving at least one of said images in a direction parallel to the axis, and means for providing an output signal when the first and second images are aligned to form a composite image of the scene, the combination comprising:
   a. a plurality of pairs of photoelectric transducers, the transducers of each of said transducer pair being disposed opposite each other on opposite sides of the interface axis for receiving light from the respective first and second images, each transducer of said transducer pairs being adapted to provide a first signal which is a function of the intensity of the light incident thereon;
   b. signal means electrically coupled to said pairs of transducers and responsive to said first signals for providing an output signal in response to detection by the transducers of the misalignment of the first and second images; and
   c. means coupled to the image-moving means and responsive to said output signal for adjusting the image positions of the first and second images in response to said output signal.

2. For use with a range-finding apparatus including means for forming first and second images, each of a discrete portion of an object scene in an image plane adjacent to each other along an interface axis, means for moving at least one of said images in a direction parallel to the axis, and means for providing an output signal when the first and second images are aligned to form a composite image of the scene, the combination comprising:
   a. a plurality of pairs of photoelectric transducers, the transducers of each of said transducer pairs being disposed opposite each other on opposite sides of the interface axis for receiving light from the respective first and second images, each transducer of said transducer pairs being adapted to provide a first signal which is a function of the intensity of the light incident thereon;

b. signal means coupled to said transducer pairs and responsive to said first signals to provide a plurality of output signals, each said output signal being effective in first and second conditions respectively indicative of equal or balanced intensity of the light received by the transducers of a particular transducer pair and an unbalanced intensity of the light received by the transducers of said particular transducer pair; and c. means coupled to said image-moving means and responsive to a predetermined number of said output signals being in said first condition for changing the image positions of the first and second images to align the first and second images.

3. The invention as set forth in claim 1 wherein said image-forming means includes cylindrical lens means adapted to focus the split image along the interface axis.

4. The invention as set forth in claim 2 wherein said photoelectric transducers are photodiodes.

5. In electrooptical rangefinder apparatus adapted to align along an interface axis two adjacent images, each of a discrete portion of an object scene to form a composite split image of the scene, the combination comprising:

a. means receiving light reflected from the object for forming the split image of the object with the adjacent images being respectively disposed on opposite sides of the interface axis and being adapted to focus the split image along the axis and provide a blurred image of the split image along an axis normal to the interface axis;

b. a plurality of pairs of photoelectric transducers, the transducers of each of said transducer pairs being respectively disposed on opposite sides of the interface axis and responsive to incident light forming a portion of one of the adjacent images of the split image to provide a first signal;

c. circuit means electrically coupled to receive said first signals produced by the transducers of each of said transducer pairs to provide a plurality of second signals each having first and second conditions respectively, indicative of the instantaneous balanced or unbalanced state of incident light received by the transducers of a particular transducer pair;

d. electronic means coupled to said circuit means and adapted to produce at least one output signal in response to a predetermined number of said transducer pairs being in said first condition; and e. means responsive to said output signal and adapted to vary the relative position of the two adjacent images of the split image until the balanced condition on the predetermined number of transducer pairs is obtained.

6. In range-finding apparatus adapted to align along an interface axis first and second adjacent images, each of a discrete portion of an object scene to form a composite split image of the scene, the combination comprising:

a. means adapted to receive light reflected from the object for forming the split image of the object with the first and second images being respectively disposed on opposite sides of the interface axis;

b. a plurality of pairs of photoelectric transducers, each transducer of said transducer pairs being respectively disposed on opposite sides of the interface axis and responsive to the intensity of incident light forming a portion of one of the first and second images of the split image to provide a first signal;

c. circuit means electrically coupled to receive each said first signal produced by said transducer pairs to provide a plurality of second signals each having a first and second conditions respectively, indicative of the balanced and unbalanced state of the intensity of incident light received by the transducers of a particular transducer pair;

d. logic means coupled to said circuit means to produce a third signal in response to a predetermined number of said second signals in said first condition; and e. means responsive to said third signal for changing the relative position of the first and second parts to align the first and second images.

7. The invention as set forth in claim 5 wherein said light-receiving means includes a cylindrical lens means adapted to sharply focus the split image along the interface axis, and provide a blurred image of the split image along an axis normal to the interface axis.

8. The invention as set forth in claim 6 wherein said photoelectric transducers are photodiodes.

* * * * *